Jan. 6, 1959　　　　C. H. O. BERG　　　　2,867,580
HYDROCARBON CONVERSION PROCESS AND APPARATUS
Filed May 11, 1956
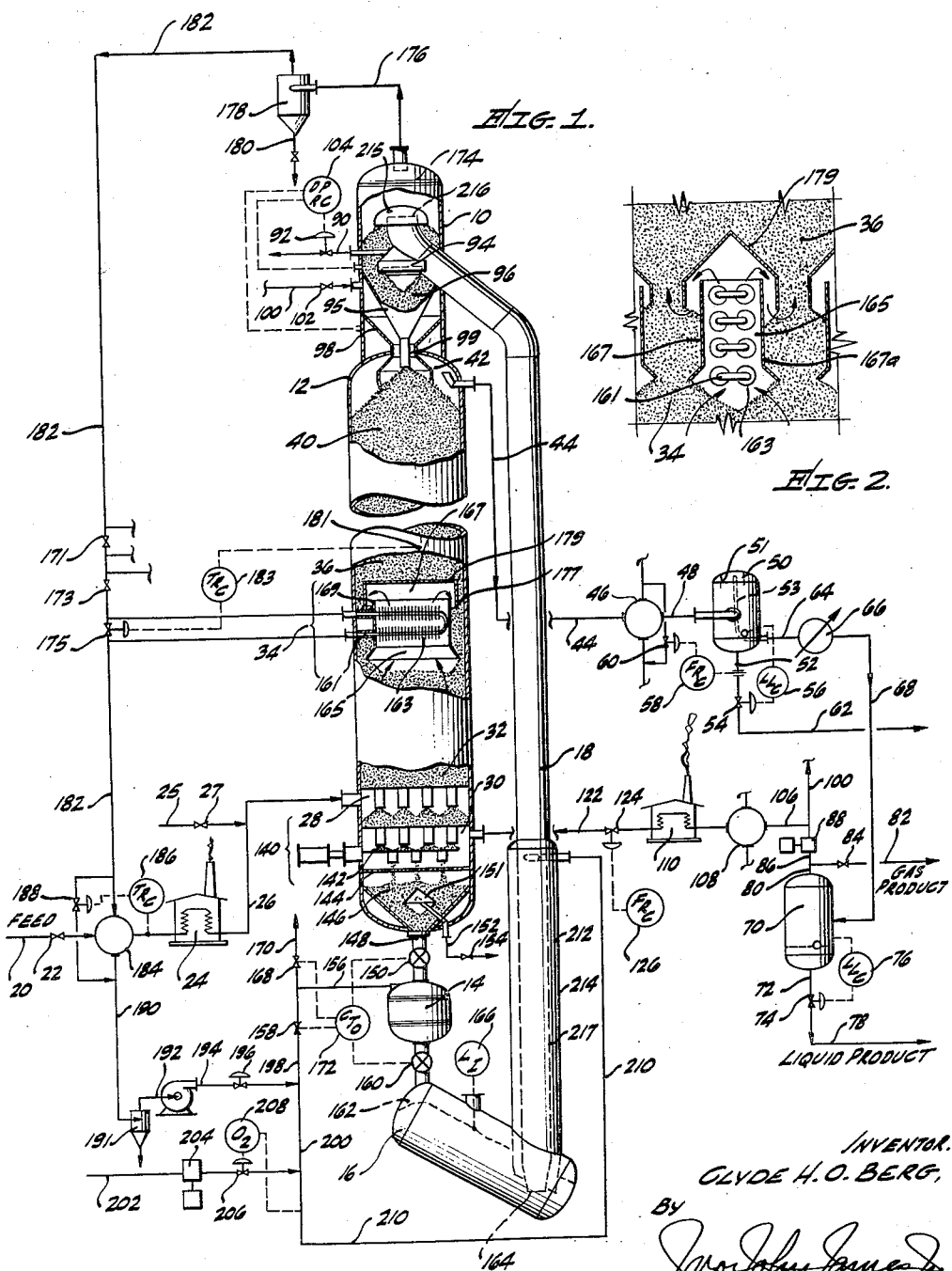
INVENTOR.
CLYDE H. O. BERG,
BY
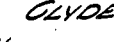
ATTORNEY.

United States Patent Office 2,867,580
Patented Jan. 6, 1959

2,867,580

HYDROCARBON CONVERSION PROCESS AND APPARATUS

Clyde H. O. Berg, Long Beach, Calif., assignor to Union Oil Company of California, Los Angeles, Calif., a corporation of California Application May 11, 1956, Serial No. 584,347

13 Claims. (Cl. 208—165)

This invention relates to a continuous process and apparatus for the contacting of a fluid with a granular solid contact material and in particular relates to an improved process and apparatus for hydrocarbon conversions wherein a hydrocarbon stream is contacted with a stream of granular solid contact material, such as a granular solid hydrocarbon conversion catalyst, which material is recirculated successively through a contacting or reaction zone and through a solids regeneration or reheating zone. One specific feature of the present invention is in the improved method and apparatus for control of the temperature of the reacting fluids passing through the downwardly moving bed of granular solid contact material in the reaction zone, and for the control of the temperature of regeneration of the spent contact material while passing it upwardly as a dense moving bed through a conveyance-regeneration zone concurrently with an oxygen-containing regeneration gas. In this invention, most of the liberated heat of regeneration is removed from the conveyance-regeneration zone directly as sensible heat of the spent conveyance-regeneration fluid.

Hydrocarbon fractions in particular and many other fluid reactant streams in general are advantageously treated under reaction conditions of temperature and pressure in the presence of a solid granular contact material, which may or may not have catalytic activity, to produce fluid products having improved properties. In the field of petroleum refining, hydrocarbon fractions normally boiling between the limits of about 75° F. and about 1000° F., such as the light and heavy naphthas or gasolines and the light and heavy gas-oil fractions, are treated at relatively high pressures and temperatures in the presence of solid contact materials to coke, crack, desulfurize, denitrogenate, hydrogenate, dehydrogenate, reform, aromatize, isomerize, or polymerize such hydrocarbon fractions to produce products having desirable properties which particularly well suit them for hydrocarbon cracking feed, gasoline blending stock, solvents, or diesel or jet engine fuels, and the like.

In all of the foregoing processes which utilize a recirculating stream of solid contact material, the usual problems of transporting the solids with minimum energy and without substantial attrition loss in a superatmospheric temperature and pressure system are involved. In some cases separate contacting and regeneration vessels are employed which require separate conveyance steps to transport the solids from the bottom of each vessel to the top of the other. In other cases these processes are effected in a single column so that only a single solids transport step is required, the regenerator and reactor being located one above the other in the column. The disadvantage of the former modification is the necessity for two columns and the requirement for two separate solids handling steps. The principal disadvantage of the second modification is primarily structural in that with superimposed reaction and regeneration zones an excessively high mechanical structure is required, sometimes exceeding 200 feet in elevation. A further disadvantage of the single column operation lies in the fact that the total conveyance distance is not materially different from the total conveyance distance in the two-column modification.

Conventionally, the granular solids have been conveyed for recirculation by mechanical elevators, by suspension in a conveyance fluid in the well-known gas lift or pneumatic conveyance systems, and the like. Although the mechanical elevators operate with quite low energy requirements, they are practically impossible to maintain at operating temperatures of around 1000° F. and at superatmospheric pressure conditions. Although the so-called gas-lift type of conveyor readily operates at superatmospheric pressures, tremendous quantities of lift gas are required in contacting systems recirculating contact material at high solids to fluid ratios. In addition, the fact that the solid particles move at relatively high velocities of the order of 50–100 feet per second and are free to impact the inner conveyor walls and each other is the cause of an excessively high solids or catalyst attrition rate.

In the present invention, all separate conveyance steps as such have been eliminated because the solids are moved upwardly through the regeneration zone and are thus recycled.

In many contacting processes, a substantial change in temperature of the fluid occurs during passage through the contacting zone due to endothermic or exothermic reactions. For example, in gasoline reforming in the presence of hydrogen and a catalyst such as cobalt molybdate and proper temperature and pressure conditions, temperature decreases as high as 100° F. occur in the conversion zone due to the endothermic nature of the hydrocarbon reactions which occur. The conventional equipment and process steps for compensating for such temperature changes are so complex that few if any commercial solids-fluid contacting processes have been designed, built, and operated to control them.

In the present invention, these temperature drops are eliminated using heat liberated in the upflow regeneration step.

The present invention is therefore directed to an integrated solids-fluid contacting process in which the conveyance and the regeneration and reaction zone temperature control problems indicated above are simultaneously eliminated by employing several novel and simple process steps and apparatus.

It is a primary object of this invention to provide an improved process for fluid-solids contacting operations in which granular solids are recirculated and simultaneously treated to effect a substantially complete reheating or regeneration during a single conveyance step, and in which the conveyance distance is approximately one-half that usually required.

It is also an object of this invention to provide an improved solids-fluid contacting process in which effective control of fluid temperature throughout the contacting zone is effected by the indirect dissipation of the liberated heat of regeneration.

A more specific object of this invention is to control the catalyst temperature in the conveyance-regeneration zone as well as the temperature of the walls thereof and to control the temperature existing in the contacting or reaction zone by the step of recirculating a conveyance-regeneration fluid directly through the solid contact material in the conveyance-regeneration zone and indirectly through a heat interchange zone disposed within the reaction zone.

It is an additional object of this invention to provide an improved apparatus for accomplishing the foregoing objects.

Other objects and advantages of the present invention will become apparent to those skilled in the art as the description thereof proceeds.

Briefly, the present invention comprises an improved process and apparatus for the continuous contacting of reactive fluids with granular solid contact material in a reaction or conversion zone. The granular material, which may have catalytic properties, is recirculated from the bottom of a reaction zone upwardly as a substantially compact or dense-packed moving bed of granular solids through a regeneration zone and is discharged therefrom in fully regenerated form into the top of the reaction zone for reuse.

It is immediately apparent that the double conveyance required in the conventional contacting processes employing separate regeneration and reaction vessels has been avoided and substituted with a solids upflow regenerator of less than half the distance heretofore required because the usually required sealing legs of great length used in gas-lift suspension conveyances are eliminated. It is also apparent that the distance for conveyance in this invention is reduced by more than one-half from the distance required in the conventional processes using superimposed reaction and regeneration zones and that accordingly the physical structure of the apparatus of this invention has been substantially reduced with attendant economic savings.

Spent granular solids removed from the bottom of the reaction zone are moved upwardly as a dense moving bed through the regeneration zone or conduit by employing a series of novel and critical steps. The spent granular solids are introduced into the regeneration zone in such a manner that its inlet opening is submerged and surrounded by a dense bed of solids to be conveyed. This is conveniently done by providing an induction zone or chamber into which the solids may be introduced at its upper end and surrounding the inlet opening of the regeneration zone at a low point therein so that solids upon introduction cover and submerge the inlet opening. Immediately adjacent the outlet opening of the regeneration zone, a means is provided for applying a thrust or compacting force against the moving bed of regenerated and conveyed granular material discharging therefrom. This may be done in several ways including the disposition of a mesh or plate or cap immediately adjacent the outlet opening against which the moving bed of solids flows and then reverses its direction. The same result may be obtained by discharging the solids in any direction directly into a chamber against a wall of the chamber or against a bed of previously discharged solids so that the outlet opening is submerged by a bed of such solids. The solids may thus be discharged upwardly or horizontally, or downwardly into such a chamber to form a conical pile of discharged solids whose apex intersects the outlet opening. The object of this step is to in some way restrict the discharge of solids at the outlet opening without effecting any substantial restriction on the discharge of regeneration fluid at the same point. The granular material in the regeneration line is thus prevented from becoming fluidized or suspended in the regeneration fluid while it is moved. In this way the moving solids are maintained substantially at their static bulk density, that is, at the same bulk density as that of a downwardly moving gravity-packed bed, which in turn is substantially the same as the bulk density of the solids when at rest.

The granular solids in this dense-packed form are caused to move by passing a concurrent flow of regeneration fluid upwardly through the regeneration zone at a rate sufficient to overcome the opposing forces of gravity acting on the solids and also to overcome opposing forces of friction of regeneration zone walls and the like which act against the solids when they are conveyed. This fluid flows through the serially connected interstices of the dense-packed mass of granular solids which presents a high resistance elongated path for the fluid flow. By maintaining a substantial pressure differential between the inlet and the outlet of the regeneration zone, a sufficient quantity of fluid is forced to flow therethrough generating a more or less constant pressure gradient at all points along the length of the regeneration zone so as to apply a force to the solids mass uniformly throughout the zone. The ratio of the resulting force tending to move the solids upwardly to the forces of gravity acting in the opposite direction has been termed the conveyance force ratio and is given by:

$$\frac{\frac{dp}{dl}}{\rho_s \cos \theta} \quad (1)$$

wherein $\frac{dp}{dl}$ is the pressure gradient in pounds per square foot per foot of regeneration zone length, $\rho_s$ is the static bulk density of the granular solids being conveyed in pounds per cubic foot, and $\theta$ is the angular deviation of the direction of solids movement from an upward vertical references axis. When the regeneration fluid flows at a rate sufficient to generate a pressure gradient which exceeds the forces of gravity expressed by the term ($\rho_s \cos \theta$) in Equation 1, a slightly additional flow of fluid is sufficient to exceed opposing forces of friction and permit the solids to move continuously in dense or compact form as an upwardly moving bed when a bed of solids is continuously supplied at the inlet and dense granular solids are continuously withdrawn at a controlled rate from the discharged mass of solids at the outlet of the regeneration zone.

Because of the substantial pressure gradient characteristic of this form of solids movement and because of the fact that there is only a relatively minor pressure differential existing between the inlet and outlet of a solids-fluid contacting vessel, it is apparent that the present regeneration system cannot be directly connected at both its outlet and inlet respectively to the solids inlet and outlet of the contacting zone. In the present invention only one of the aforementioned connections is made and the other connection is made indirectly through a granular solids pressuring vessel into which granular solids are charged at a relatively low pressure, the vessel is sealed, high pressure fluid is injected to increase the pressure by an amount approximating the characteristic pressure differential of the regeneration zone, and then the solids are discharged at the higher pressure. If the inlet to the regeneration zone communicates directly with the outlet of the reaction zone, this pressuring step is employed to receive solids from the outlet of the regeneration zone and to pressure them into the top of the reaction zone. When the outlet of the regeneration zone communicates directly with and at substantially the same pressure as the reaction zone, the pressuring zone receives solids at that pressure from the bottom of the reaction zone and pressures them into the inlet of the regeneration zone as is illustrated in the accompanying drawing. So far as the present invention is concerned, the pressuring step can be in any part of the cycle, that is, either before or after regeneration.

The present invention is particularly well adapted to the handling of granular solid materials in the well-known hydrocarbon conversion processes mentioned above and in which a liquid or vaporized hydrocarbon is contacted directly with a moving mass of contact material, usually having catalytic activity. During such processes, the catalyst ordinarily becomes deactivated after a variable period of contact and is contaminated by a hydrocarbonaceous deposit generally referred to as "coke." During the regeneration, the coked catalyst is treated with an oxygen-containing regeneration gas whereby the hydrocarbonaceous material is burned from the catalyst and the activity is restored. With most spent hydrocarbon conversion catalysts, the oxygen-containing regeneration gas will not initiate and sustain combustion until the spent catalyst is raised in temperature to about 700° F. Most hydrocarbon conversion catalysts also cannot be heated during regeneration to temperatures much above about 1200° F. and the spent conveyance-regeneration gas is disengaged from the regenerated catalyst at temperatures below this value. These then are the temperature limits within which the conveyance-regeneration zone must operate when handling spent hydrocarbon conversion catalysts.

In the process of this invention, the removal of heat from the regeneration zone is by direct heat exchange and is effected by maintaining a recycle of regeneration gas upwardly through the regeneration zone and then through external heat interchange means, located in part within the reactor itself but out of contact with the solids, and then back into the inlet of the zone. The regeneration gas is disengaged from the regenerated solids and discharged at the top of the unit at temperatures of the order of 1100° F. Ordinarily these gases can only be cooled to a temperature which will initiate combustion of the hydrocarbonaceous spent solids, that is, about 700° F. However, in the present invention a heat interchange step is effected along at least the first or lower part of the length of the regeneration zone itself thereby maintaining low wall temperatures and permitting the regeneration gases to be cooled externally to temperatures considerably below this usual minimum temperature and then reheated at least to the minimum 700° F. value in the primary heat exchange zone before the gases are introduced into the regeneration zone inlet. This permits a substantial decrease in the required diameter of the regenerator conduit which improves the heat transfer as well as a decrease in the quantity of regeneration gas recycle needed to remove the heat generated in the regeneration system. This is due to the fact that in this specific type of upflow regeneration the major portion of the coke burn-off occurs in the lower or first portion of the regeneration zone and the minor portion of regeneration occurs in the upper regions of the zone. Accordingly the externally cooled regeneration gas is preheated from well below the spent catalyst ignition temperature by passing it around the lower part of the regeneration zone whereby it cools the zone walls and is heated to the temperature necessary to initiate combustion. It is then introduced with the absorbed sensible heat directly into the regeneration zone for upward passage therethrough. Employing this technique has permitted reductions in regeneration fluid recycle of up to 75% because the recycle gas can herein readily be cooled from 1200° F. or higher to as low as 150° F. or lower (with condensate removal provision) instead of only to the 700° F. figure mentioned above.

The external heat exchange means referred to above is comprised of two essential parts. The first part consists of one or more indirect heat exchange means disposed out of contact with the solids inside the reactor column at one or more points between the feed inlet and the effluent outlet. The spent regeneration gas is passed therethrough at temperatures of the order of 1000–1200° F. to reheat indirectly the reactant vapor passing through the reactor. The flow rate is controlled to compensate for undesirable temperature decreases otherwise caused by the endothermic nature of the hydrocarbon conversion reactions occurring. By this means, and in an apparatus more clearly described in connection with the drawings, the reactant vapors are maintained substantially at the desired reaction temperature throughout the reactor. In the case of combined desulfurization and reforming of naphtha this reaction temperature is between about 880° F. and 975° F., the temperature may average out at a constant value, or it may rise with distance from the inlet.

The second part of the heat exchange means is an interchanger in which the partially cooled regenerator off gases, after flowing through the reactor heater or heaters, are further cooled in exchange with the feed hydrocarbon and recycle hydrogen or both. Recycle hydrogen is used in such hydrocarbon conversions as catalytic desulfurization, denitrogenation, deoxygenation, reforming, hydrocracking, isomerization, and the like. In this exchanger the partially cooled regenerator off gases are further cooled to dissipate the remaining heat liberated during the catalyst regeneration. Due to these substantial increases in heat recovery, substantial reductions are provided in the heating capacity required to operate the contacting process in which this invention is employed. The present invention is therefore applicable to any recirculatory solids-fluid contacting process involving an exothermic regeneration of the contact material and an endothermic reaction such as reforming, cracking, etc. in the other contacting zone. Other specific applications will occur to those skilled in the art from the present description.

The present invention will be more readily understood by reference to the following description of the attached drawings in which:

Figure 1 shows a schematic flow diagram of the process of this invention and a detailed elevation view in partial cross section of the reaction and regeneration apparatus, and Figure 2 shows additional details of the reactor heaters.

The description is conducted in the form of a specific example of the invention as applied to the continuous catalytic reforming and desulfurization of a petroleum naphtha in the presence of hydrogen containing recycle gas and a cobalt molybdate catalyst.

The permissible operating conditions for naphtha reforming and desulfurization are from 700 to 1100° F., from 50 to 2000 p. s. i. g., and from 500 to 10,000 s. c. f. of hydrogen per barrel of naphtha feed. The following example gives the specific operating conditions of one installation.

Referring now more particularly to Figure 1, the apparatus consists essentially of catalyst separator and pretreating chamber 10 into which the regenerated catalyst is discharged, naphtha reforming and desulfurization column 12 through which the catalyst passes downwardly as a moving bed by gravity, catalyst pressuring chamber 14 receiving spent catalyst from column 12, induction chamber 16 into which the spent pressured catalyst is discharged, and regeneration chamber 18 through which the spent catalyst is moved upwardly and regenerated by means of a regeneration fluid flow, and the regenerated catalyst is discharged for pretreatment and recirculation into separator chamber 10.

The apparatus of this invention as shown is designed for the catalytic reforming and desulfurization of 1100 barrels per stream day of a petroleum naphtha having the following properties:

TABLE I

Naphtha feed

| | |
|---|---|
| Boiling range, ° F | 241–418 |
| ° API gravity | 46.3 |
| Sulfur, weight percent | 0.579 |
| Nitrogen, weight percent | 0.020 |
| Knock rating (F-3) | 73.0 |
| ASTM gum | 45.0 |

This naphtha feed is introduced through line 20 at a rate of 1100 barrels per day controlled by valve 22 and is preheated by exchange with hot regeneration gas recycle in interchanger 184 described subsequently and then is further heated and vaporized in fired heater 24. The naphtha vapor is introduced through transfer line 26 at a temperature of 920° F. and a pressure of 405 p. s. i. g.

into naphtha engaging zone 28 in column 12. A primary stream of recycle gas containing hydrogen is introduced through primary recycle gas engaging zone 30 at a rate of 1700 MSCF. per day and at a temperature of 920° F. The mixture of naphtha vapor and hydrogen passes upwardly through primary reforming zone 32 countercurrent to the downflowing bed of cobalt molybdate catalyst. Herein the cyclization of paraffin hydrocarbons takes place to form naphthenes and the endothermic aromatization of the naphthene hydrocarbons results in a temperature decrease. To maintain an approximately constant temperature profile throughout the reactor, one or more reactor heater zones 34 are provided and through which regeneration zone off-gas is passed in an amount sufficient to reheat the vapors to about 920° F., or any other desired temperature. The thus reheated mixture passes countercurrent to the catalyst through secondary reforming zone 36 wherein a further temperature decrease takes place due to the endothermic aromatization reactions. One or more additional reactor heater zones reheat this cooled mixture again to about 920° F., or higher if an increasing temperature profile is desired. The mixture then continues upwardly through tertiary reforming zone 40 from which the effluent is removed from disengaging zone 42 at a temperature of about 880° F. and at 400 p. s. i. g. through line 44.

The effluent vapor is passed through interchanger 46 wherein heat is recovered in depropanizing the product and for preheating the naphtha feed and is thereby cooled to a temperature of 450° F. which is just sufficiently below the dew point of the effluent to effect a partial condensation of polymeric high boiling hydrocarbon materials having substantial gum-forming tendencies when employed as internal combustion engine fuels. The cooled and partially condensed effluent then passes through line 48 and is introduced into separator 50 which is preferably a centrifugal separator of the Webre cyclone type. Herein the partial condensate, amounting to a very small part of the total effluent, is separated from the vapor and is removed through line 52 at a rate controlled by valve 54 in accordance with liquid level controller 56. Flow recorder controller 58, which is adjusted to maintain a predetermined rate of flow of condensate through line 52 operates coolant bypass valve 60 so that the hot effluent flowing through line 44 is cooled sufficiently to partially condense the desired proportion of the reactor effluent.

The separator 50 as employed in this specific process was a cylindrical vessel 18 inches inside diameter and 6.0 feet high. The cooled and partially condensed reactor effluent was introduced tangentially at a point 3.0 feet from the bottom, the condensate was removed through an outlet at the bottom of the vessel, and the non-condensed vapor was removed through an outlet conduit 53 which extended from a central point within the vessel near the top thereof and downwardly essentially along the vertical axis of the vessel and then through the wall near the bottom thereof. This permits a rapid rotation of the vapor within the vessel around the outlet pipe and an effective centrifugal separation of the heavy partial condensate which collects on and flows down the inside of the vessel wall. A drip ring 51 was incorporated in the top of separator 50 to prevent condensate entry into outlet pipe 53.

The preferred proportion so condensed is a very minor amount ranging from 0.01% up to about 10% by volume. Preferably this proportion is between about 0.1% and about 5% and in the experimental verification of the present invention it has been found that partial condensation of about 2.2% by volume is sufficient to substantially eliminate the so-called heavy ends or polymer from the effluent so as to avoid the usual necessity for rerunning the depropanized liquid product.

In the present invention, slightly more than 2% by volume of the effluent is condensed and is removed at a rate of 22 barrels per day by means of line 62. This material contains some reformed gasoline boiling below about 420° F. and accordingly is returned for redistillation with the material from which the naphtha feed to the process of this invention is prepared. This step, not shown for sake of simplicity in the drawing, is entirely conventional and effects a recovery of approximately 14.5 barrels of reformed gasoline boiling range product boiling below about 420° F. The net polymer production is about 7.5 barrels per day.

The uncondensed portion of the effluent flows from cyclone 50 at a temperature of about 450° F. through line 64 and is further cooled and condensed in interchanger 66 in which heat is recovered by heat exchange with the hydrogen recycle gas as subsequently described. The condensed effluent together with the uncondensed hydrogen recycle gas flows through line 68 into product separator 70 in which the uncondensed gases are separated from the process product. The reformed naphtha product is removed through line 72 at a rate of 1100 barrels per day controlled by valve 74 in response to liquid level controller 76. This liquid is sent by means of line 78 to a conventional depropanizer, not shown, wherein propane and lighter hydrocarbon gases are separated to produce the reformed naphtha product of this invention. This product is produced at a rate of 1028 barrels per day and has the following properties:

TABLE II

*Reformed naphtha product*

| | |
|---|---|
| Boiling range, °F | 115–427 |
| API gravity | 48.7 |
| Sulfur, weight percent | 0.007 |
| Nitrogen, weight percent | 0.001 |
| Knock rating (F–1+3 cc. TEL) | 93.7 |
| ASTM gum, mg./100 cc | 2 |

The uncondensed portion of the effluent consists essentially of the hydrogen-containing recycle gas which is removed from separator 70 by means of line 80 and because of the net production of hydrogen in the process, the excess portion of this is bled from the system through line 82 at a rate of 140 MSCF. per day controlled by valve 84. Part or all of this gas may be employed as fuel in the fired heaters in the process if desired.

The remaining recycle gas is passed through line 86 and is compressed from 375 p. s. i. g. to 425 p. s. i. g. in recycle gas compressor 88. Part of this compressed recycle gas is passed as a regenerated catalyst pretreating gas through line 100 at a rate of 165 MSCF. per day controlled by valve 102 into separator and catalyst pretreating chamber 10. This pretreating gas is introduced below cone-shaped baffle 95 and passes therefrom downwardly through the annular space within the lower periphery of baffle 98 and then directly into the top of the bed of regenerated catalyst in chamber 10. A first part of this gas passes upwardly through sealing leg 99 and pretreating zone 96 countercurrent to the regenerated catalyst. By means of this countercurrent passage of gas the catalyst is pretreated with hydrogen to reduce the higher oxides of cobalt and molybdenum formed during regeneration to the lower oxides. The pretreating gas, along with excess regeneration gas coming down from the top of the lift line, are removed from beneath baffle 94 through line 90 controlled by valve 92. The remaining portion of the pretreating gas introduced through line 100 and passed downwardly into the top of reactor 12, passes radially outwardly below the lower periphery of baffle 98 and is disengaged from the catalyst bed with the total reactor effluent in disengaging zone 42 at points around the lower periphery of baffle 98 and through line 44, and acts as a seal gas preventing the upflow of reactor effluent into the pretreating chamber 10. The spent pretreating gas and excess regeneration gas are removed from separator chamber 10 at a point below baffle 94 through line 90 at a rate of 205 MSCF. per day controlled by valve 92 which in turn is actuated by differential pressure controller 104 to maintain a positive pressure differential between the top and the bottom of catalyst pretreating zone 96, that is, the pressure above cone-shaped baffle 95 is slightly less than the pressure below it and within baffle 98.

The remaining portion of the compressed recycle gas flows at a rate of 4120 MSCF. per day through line 106 and is preheated in interchanger 108 to 350° F. in exchange with the reactor effluent after polymer removal (interchanger 66).

Of this preheated recycle gas, 4160 MSCF. per day are further heated in fired preheater 110 to a temperature of about 950° F. The primary hydrogen recycle gas is introduced into engaging zone 30 via line 122 at a rate of 3500 MSCF. per day controlled by valve 124 and controller 126. The remaining 660 MSCF. per day of hydrogen is introduced via line 25 controlled by valve 27 into the naphtha transfer line 26.

The spent hydrocarbonaceous catalyst passes downwardly through the column 12 at a rate controlled by solids feeder and stripper 140 which is provided with a reciprocating tray 142 and a lower stationary tray 144 so that upon reciprocation of tray 142 a substantially constant volumetric withdrawal of spent catalyst uniformly throughout the cross-sectional area of column 12 is achieved. Spent catalyst from feeder 140 accumulates as bed 146 which constitutes a surge volume, the level of which rises and falls as granular solids are withdrawn from the bottom of the column periodically through outlet 148 controlled by motor valve 150.

The spent solids are thus discharged into pressuring chamber 14 when it is depressured to about 400 p. s. i. g. causing a displacement gas to flow upwardly through outlet 148 into the bottom of reactor 12. A seal gas comprising a mixture of this last-named gas and a small portion of the primary recycle gas stream, which passes downwardly through solids feeder 140, is removed from disengaging zone 151 through line 152 at a rate of 140 MSCF. per day controlled by valve 154. This gas is mixed with the spent catalyst pretreating gas removed from the upper part of the column through line 90 and is employed as fuel.

The spent granular solids in pressuring chamber 14 are raised in pressure to 430 p. s. i. g. by the introduction of regeneration recycle gas through manifold 156 upon the opening of valve 158 described below. Following this pressuring step, valve 160 is opened and the pressured solids are discharged by gravity into induction chamber 16 to maintain the downwardly flowing bed 162 of spent granular catalyst to be conveyed and regenerated so as to submerge the lower inlet opening 164 of the regeneration chamber. Level indicator 166 is provided to indicate the solids level of bed 162.

Valve 160 is then closed, motor valve 168 is then opened, and pressuring vessel 14 is depressured from 430 pounds to about 400 pounds by the discharge of gas through lines 156 and 170. Valve 168 is then closed and valve 150 is reopened to remove additional spent catalyst and the solids pressuring cycle is repeated. The operation of motor valves 150, 158, 160, and 168 is controlled in sequence by cycle timer operator 172 so as to receive solids, pressure, discharge solids, and depressure at a rate sufficient to charge solids into induction chamber 16 at a rate equal to the solids circulation rate set by solids feeder 140.

Referring now to solids pretreater and separator 10, spent regeneration gases collecting in space 174 are removed therefrom through line 176 at a rate of 1612 MSCF. per day and a temperature of 1150° F. This gas is passed into solids separator 178 wherein any catalyst fines elutriated from the catalyst stream in separator 10 are removed from the regeneration gas recycle. These solids are removed from separator 178 by means of line 180.

The hot off gases continue through line 180 through control valves 171, 173, and 175 and any others not shown to provide a pressure drop sufficient to force a fraction of the hot spent regeneration gases through the one or more intermediate reactor heater zones hereinafter more fully described. This serves to cool the hot regeneration zone off gases in steps as they pass through successive reheating zones to maintain the desired high reaction temperature in reaction zones 32, 36, 40, etc. in contacting column 12. The hottest regeneration gas thus heats the reactant vapor nearest the product outlet. In reforming naphtha this is highly effective since the product is at this point least susceptible to high temperature decomposition and a rising reaction temperature can be maintained.

The thus partially cooled regeneration gas then flows through line 182 through heat exchanger 184 in exchange with raw naphtha feed referred to above and is therein cooled to a temperature of about 640° F. This temperature is controlled by temperature recorder controller 186 which operates bypass valve 188 so as to control the naphtha heating medium passing through interchanger 184. The cooled recycle gas passes through line 190 and condensate separator 191 and is compressed to 430 p. s. i. g. in compressor 192. This recycle gas then flows through line 194 at a rate controlled by valve 196 and is divided into a solids pressuring stream flowing through line 198 to pressure solids in chamber 14, and a conveyance-regeneration stream flowing from line 200.

Referring now in Figure 1 to the reactor reheating zone 34 in contacting column 12, this zone is provided with one or more tubes 161 provided with fins 163. The fins are preferably vertically disposed within the reactor. The partially cooled reactant vapors pass between the fins and are reheated after being separated from the downwardly moving bed of catalyst solids. One or more of such finned tubes are disposed in an open heat transfer zone 165 located at one or more points within contacting column 12, such as between a pair of parallel plates disposed vertically and extending substantially across the reactor. One such plate 167 is shown in Figure 1. At the ends of these parallel plates are provided end closures 169 and 177 providing an open rectangular chamber open at its upper and lower ends and containing therein the banks of finned tubes referred to above. The upper open end of this solids-free heat exchange zone is covered by rounded or gabled cap 179 whereby the downwardly moving solids are directed around on each side of the reheating zone or zones and move downwardly through a solids flow zone as a dense bed all around the heat transfer zone.

Because the resistance to flow of reactant vapors is considerably higher through the downwardly moving mass of solids in the solids flow zone which surrounds the above described heat transfer zone, only a minor portion of the rising vapors from first reaction zone 32 pass upwardly through the descending solids around each reheating zone and generate therein a pressure differential sufficient to force the major proportion of the rising vapors upwardly through the open heat transfer zone and through direct contact with the banks of finned tubes shown. The rising vapors are hereby reheated, pass upwardly below cap 179, and then downwardly past the lower edge of the cap into reengagement with the downwardly moving solids. The vapors pass upwardly through the next reaction zone, here designated as zone 36. The temperature of these reheated vapors is measured at a point just above cap 179 by means of thermocouple or other means 181. This actuates temperature recorder controller 183 which in turn regulates hot regeneration gas bypass valve 175 so as to maintain the reheated vapors at the desired reaction temperature.

Obviously one or more of these reheating zones may be disposed along the length of a given reaction zone. The number employed depends of course upon the extent to which endothermic reactions decrease the temperature of the reacting vapors and also upon the degree of deviation which can be tolerated from isothermal or any other desired temperature conditions. In the present example three such reheating zones were employed to raise the temperature of a mixture of naphtha vapor and hydrogen from temperatures of about 890° F. to temperatures of about 930° F. in a combined desulfurizing and reforming operation using cobalt molybdate catalyst.

Referring now to Figure 2, a fragmentary end view taken at right angles to the view in Figure 1 is shown the reheating system. Equipment elements which are also shown in Figure 1 are here designated by the same numbers. The upper gable or cap 179 serving to maintain the empty space 165 free of solids is clearly shown, as are the parallel, vertically disposed plates 167 and 167a constituting the sides of the reheating zone. A bank of finned tubes 161 having fins 163 is here shown. The vapor flow occurring in this system is indicated by the arrows.

Referring again to Figure 1 and continuing to follow the flow of the partially cooled regeneration gas recycle, this recycle gas then flows through line 182 through heat exchanger 184 in exchange with raw naphtha feed referred to above and is therein cooled to a temperature of about 640° F. This temperature is controlled by temperature recorder controller 186 which operates bypass valve 188 so as to control the quantity of regeneration gas passing through interchanger 184. The cooled recycle gas passes through line 190 and condensate separator 191 and is compressed to 430 p. s. i. g. in compresser 192. This recycle gas then flows through line 194 at a rate controlled by valve 196 and is divided into a solids pressuring stream flowing through line 198 to pressure solids in chamber 14, and a regeneration stream flowing from line 200.

An oxygen-containing gas, such as air is introduced via line 202. It is compressed to 433 p. s. i. g. in compressor 204 and is introduced at a rate of 123 MSCF. per day controlled by valve 206 in response to oxygen recorder controller 208 for combination with the compressed regeneration recycle gas flowing through line 200. The combined oxygen-containing regeneration gas, which may contain from about 0.1 to about 10% oxygen and preferably from 0.5 to 5.0% oxygen, then passes at a temperature of about 256° F. and at a rate of 1735 MSCF. per day through line 210 tangentially into the upper portion of regenerator heat exchange zone 212. This zone is contained within the annulus between the lower portion of regeneration conduit 18 and jacket 214 which surrounds concentrically the lower portion of the regeneration conduit. The regeneration gas passes downwardly through zone 212 and is preheated therein by means of the exothermic heat of regeneration liberated within the lower part of regeneration zone 18 to a temperature of about 706° F. This preheated gas is injected directly into induction chamber 16 at a point below the level of the spent catalyst to be conveyed, it passes into inlet 164 of the regeneration zone, and then upwardly therethrough at a rate sufficient to effect upflow regeneration of the spent catalyst.

The regenerated solids discharge at outlet 216 against cap 215 which applied a force against the solids stream issuing from the outlet to maintain the catalyst solids during regeneration as a moving mass having a density substantially equal to the static bulk density. The regenerated catalyst is discharged against baffle 215 which applies a force against the mass of catalyst issuing from regeneration conduit 18 and maintains the upwardly moving catalyst at a bulk density substantially equal to the static bulk density thereof.

As stated above, the major part of the coke burn-off from the catalyst occurs in the lower or first part of the regeneration zone and a substantial part of this endothermic heat is transferred through the regeneration conduit wall to preheat the regeneration gas recycle and to keep the inner regeneration conduit wall 217 cool. All of the net endothermic heat of regeneration however is removed as sensible heat in the regeneration recycle, with the exception of usual heat losses, and most of it is recovered in heating the reactor and preheating the feed.

The spent granular catalyst is substantially completely regenerated while passing upwardly through the upflow regeneration conduit and is discharged from outlet opening 216 of the regeneration conduit into separator chamber 10 previously described.

Because of the fact that the granular catalyst is maintained as a dense upwardly moving compact bed substantially at the static bulk density of the catalyst, the upward velocity and accordingly the residence time of the spent catalyst in the regeneration system is not limited by the height of the regenerator or by the velocity of the regeneration fluid circulated therethrough, as is the case in the conventional gas-lift or suspended solids systems. Once the regeneration fluid rate is sufficient to exceed the opposing forces of gravity and friction on the moving bed, the catalyst will move as continuously fed at the inlet and removed from the outlet and at a flow rate determined by solids feeder zone 140. Any necessary increases in regeneration fluid rate to remove heat from the system have absolutely no effect whatsoever upon the rseidnce time of the catalyst in the system or the degree to which it is regenerated and the only external effect is one of a somewhat increased pressure differential.

Accordingly in the present process the spent catalyst may be completely regenerated by the removal of the entire quantity of hydrocarbonaceous deactivating materials during an upflow regeneration. In the present example, this is accomplished by utilizing an oxygen concentration of about 2.0% at the inlet of the regeneration zone. The spent catalyst analyzes about 4.1% carbon and is discharged into separator 10 after regeneration analyzing less than about 0.05% carbon, the restoration of activity is essentially 100%.

In the apparatus of this invention, the entire structure above grade level is about 55 feet in height, the reactor column diameter is 4 feet 6 inches, and the regeneration conduit is 14-inch schedule 40 pipe. The catalyst is circulated at a rate of 10.3 tons per day and moves at an upward velocity of 15 feet per hour through the regeneration conduit. This low velocity is totally impossible to maintain in a gas-lift or pneumatic conveyor system and herein it permits the complete regeneration of the catalyst during the lifting step. It is obvious that all conveyors and sealing legs have thus been eliminated.

It is not intended that the above detailed description of the process of this invention as applied to cobalt molybdate reforming and desulfurization of gasoline be considered limiting because the treating process hereinabove described may just as well and with comparable advantageous results be applied to any solids-fluid contacting process involving a catalyst or other contact material, an elevated reaction temperature, an exothermic regeneration, and a net endothermic contact reaction.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a solids-fluid contacting process wherein a stream of granular solid contact material is recirculated generally downwardly through a fluid contacting zone and then upwardly as a moving bed through a solids conveyance regeneration zone, a reactant fluid is passed through said contacting zone in direct contact with said contact material therein, a conveyance-regeneration fluid is recirculated upwardly through said conveyance-regeneration zone at a rate sufficient to maintain a substantial pressure gradient therein and to convey said material therethrough and to regenerate it, and a force is applied against the regenerated material discharging therefrom to maintain it at a bulk density substantially equal to its static bulk density, the improvement which comprises passing at least part of said regeneration-conveyance fluid from the outlet of said conveyance-regeneration zone through a closed cyclic path external to said conveyance-regeneration zone, decreasing the pressure of the circulating fluid in said external path at at least one point therein thereby forcing at least part of said fluid through at least one reheating zone within said contacting zone in indirect heat exchange relation with the reactant fluid only and out of contact with said solids which surround said reheating zone thereby cooling said regeneration fluid to recover at least part of heat of regeneration contained as sensible heat therein and supplying heat to said reactant fluid passing through said contacting zone, adding additional regeneration fluid to the cooled regeneration fluid, passing the cooled regeneration fluid through a regeneration fluid preheating zone in indirect heat exchange with at least the first part of said conveyance-regeneration zone to absorb heat of regeneration therefrom, and injecting the preheated fluid into the inlet of said conveyance-regeneration zone to convey and regenerate said solid contact material.

2. In a solids-fluid contacting process wherein a moving bed of granular solid contact material is passed downwardly by gravity through a contacting zone, a fluid is passed therethrough at controlled conditions of temperature, pressure and composition in direct contact with said moving solids bed to effect an endothermic reaction thereby forming spent solids, said spent solids are passed upwardly as a moving bed through a solids conveyance regeneration zone concurrently with a recirculating regeneration fluid at regeneration conditions of temperature, pressure, and composition and at a rate sufficient to generate a substantial pressure gradient therein to convey said bed of solids, said upwardly moving bed is maintained at substantially the solids' static bulk density by applying a force to the bed of regenerated solids issuing from said conveyance-regeneration zone, and said solids are returned for repassage through said contacting zone, the improvement in removing the heat generated during the regeneration of said solids and supplying the endothermic heat of reaction in said contacting zone which comprises disengaging hot regeneration fluid from the regenerated solids, passing it through a closed cyclic path external to said conveyance-regeneration zone, dropping the pressure of said hot regeneration fluid at at least one point in said path thereby forcing at least part of said fluid through at least one reactant reheating zone within said contacting zone out of direct contact with said solids therein surrounding said reheating zone as a downwardly moving dense bed and in indirect heat exchange relation with the fluid passing therethrough and at a rate sufficient to reheat said fluid thereby cooling said hot regeneration fluid, injecting fresh regeneration fluid into admixture with regeneration the cooled fluid, and injecting the fluid mixture into said conveyance-regeneration zone to convey and regenerate said upwardly moving bed of solids thereby maintaining a recirculating stream of conveyance-regeneration fluid directly through said regeneration zone and indirectly through said contacting zone.

3. A process according to claim 2 wherein said reactant reheating zone comprises a solids free heat exchange zone through which the reactant fluids flow in contact with heat exchange surfaces, and a solids flow zone surrounding the heat exchange zone through which said solids pass by gravity in dense moving bed form.

4. A process according to claim 2 in combination with a plurality of said reactant reheating zones spaced apart from one another in said contacting zone, said fluid being contacted passing successively in said contacting zone through an alternate series of reaction zones and heat exchange zones, said solids passing successively through an alternate series of reaction zones and solids flow zones within said contacting zone.

5. A process according to claim 2 in combination with the steps of detecting the temperature of said fluid in said contacting zone at a point downstream therein from said heat exchange zone, and controlling the drop in pressure of hot regeneration gas and thereby changing the flow rate of said gas passing indirectly through said heat exchange zone to maintain the desired temperature profile of said fluid passing through said contacting zone.

6. In an endothermic hydrocarbon conversion process wherein a moving bed of solid hydrocarbon conversion catalyst is passed downwardly by gravity through a hydrocarbon conversion zone, a hydrocarbon is passed therethrough at hydrocarbon conversion conditions of temperature, pressure, and composition in direct contact with said catalyst to form converted hydrocarbons and spent catalyst solids deactivated by a hydrocarbonaceous deposit, said spent catalyst is passed upwardly as a moving bed through a catalyst conveyance-regeneration zone concurrently with an oxygen-containing conveyance-regeneration gas at catalyst regeneration conditions of temperature, pressure, and composition at a rate sufficient to generate a substantial pressure gradient therein to convey said bed of catalyst, a force is applied against the regenerated catalyst discharging therefrom to maintain said upwardly moving bed substantially at the catalyst's static bulk density, and said regenerated catalyst is returned for repassage through said hydrocarbon conversion zone, the improvement in maintaining said hydrocarbon conversion zone at the desired temperature and cooling the conveyance regeneration zone which comprises maintaining at least one hydrocarbon reheating zone containing a parallel heat exchange and solids flow zone within said hydrocarbon conversion zone, passing the solid catalyst downwardly through alternate reaction zones and solids flow zones and passing said hydrocarbon through alternate reaction zones and heat exchange zones in said contacting zone, disengaging hot spent regeneration gas from the regenerated catalyst, recirculating said regeneration gas in a closed cyclic path external to said regeneration zone, decreasing the pressure of said gas at least once in said closed cyclic path thereby forcing at least part of said gas to flow through each heat exchange zone in indirect heat exchange relation with said hydrocarbon only and out of heat exchange relationship with said solids thereby partially cooling said regeneration gas and reheating the endothermally cooled hydrocarbon reactant, removing partially cooled regeneration gas from the heat exchange zone, adding fresh regeneration gas containing oxygen thereto, and introducing the mixture thus formed into said conveyance-regeneration zone to maintain the regeneration gas recycle.

7. A process according to claim 6 wherein said hydrocarbon conversion is a reforming reaction, said catalyst is cobalt molybdate, said hydrocarbon is a petroleum naphtha, said gas introduced into said conveyance-regeneration zone comprises flue gas containing between about 0.1% and about 10% of oxygen, said conversion conditions of temperature, pressure and composition are, respectively, 700° F. to 1200° F., 50 p. s. i. g. to 2000 p. s. i. g., and 500 to 10,000 s. c. f. of hydrogen per barrel of naphtha, and a plurality of said hydrocarbon reheating zones are disposed along the length of said hydrocarbon conversion zone.

8. In a process for the endothermic conversion of hydrocarbon wherein a moving bed of solid granular hydrocarbon conversion catalyst is passed downwardly by gravity through a hydrocarbon conversion zone, hydrocarbon conversion conditions of temperature, pressure, and composition are maintained therein while a hydrocarbon is endothermally converted in direct contact with said catalyst forming a spent hydrocarbonaceous catalyst, said spent catalyst is pressured in a solids pressuring zone to a substantially higher pressure, the pressured solids are then passed into an induction zone to maintain a moving bed of spent catalyst therein submerging the inlet opening of an elongated conveyance-regeneration zone, said spent catalyst is conveyed to the top of said conversion zone and simultaneously regenerated by passing it upwardly as a moving bed through said conveyance-regeneration zone concurrently with a flow of an oxygen-containing conveyance-regeneration gas, and said catalyst is maintained substantially at its static bulk density in said upwardly moving bed by applying a force against the mass of regenerated catalyst discharging from said conveyance-regeneration zone, the improvement which comprises maintaining a plurality of hydrocarbon reheating zones spaced apart from one another along the length of and within said conversion zone, said reheating zone comprising a solids free heat exchange zone surrounded by a solids flow zone, said solids thus passing downwardly through said conversion zone through alternate reaction and solids flow zones, said hydrocarbon passing through said conversion zone through alternate reaction and reheating zones, maintaining a recirculation of said conveyance-regeneration gas generally downwardly through a closed cyclic path external to said conveyance-regeneration zone and upwardly through said conveyance-regeneration zone to convey and regenerate said spent catalyst and to adsorb as sensible heat the heat liberated during regeneration by the steps of disengaging hot spent regeneration gas from the bed of regenerated catalyst, successively decreasing the pressure of said conveyance-regeneration gas in plural steps in said cyclic path thereby passing at least part of said gas successively through each of said heat exchange zones in indirect heat exchange relation with the hydrocarbon flow therethrough but out of heat exchange relationship with the surrounding solids to recover the heat of regeneration thereby cooling said regeneration gas and supplying the endothermic heat of hydrocarbon conversion in said contacting zone, further cooling the thus partially cooled regeneration gas in the external path, separating any condensate formed during the latter cooling step, compressing the cooled gas to a pressure substantially equal to that of said hydrocarbon conversion zone plus the pressure differential maintained between the inlet and the outlet of said conveyance-regeneration zone, adding sufficient oxygen-containing gas to the compressed gas to provide a conveyance-regeneration gas containing between about 0.5% and 5.0% of oxygen, and passing said conveyance-regeneration gas into the bed of spent pressured catalyst, submerging the inlet of said conveyance-regeneration zone in said induction zone whereby said gas recirculates into said inlet and flows upwardly through said conveyance-regeneration zone.

9. A process according to claim 8 in combination with the step of passing a part of said cooled compressed gas into said pressuring zone to raise the pressure of gases in the interstices of the spent catalyst therein from a pressure substantially equal to that in said conversion zone by an amount substantially equal to the pressure differential existing between the inlet and the outlet of said conveyance-regeneration zone.

10. In an apparatus for contacting a fluid with a recirculating stream of granular solid contact material including at successively lower levels a solids-receiving and fluid disengaging chamber, a contacting column, a solids pressuring chamber, and a solids induction chamber; an elongated conveyance-regeneration conduit communicating at its inlet with a low point in said induction chamber and at its outlet with said solids-receiving and fluid disengaging chamber, means adjacent said outlet to apply a force against solids discharging therefrom to maintain them in said conduit substantially at their static bulk density, means for passing a fluid through said contacting column, a fluid outlet for disengaged fluid from said fluid disengaging chamber, a return conduit forming a closed cyclic path for recirculating regeneration gases external to and then through said conveyance-regeneration conduit, and fluid conduit means communicating with said solids pressuring chamber for the introduction and removal of fluids, the improvement which comprises at least one gas pressure decreasing means disposed in said return conduit to decrease the pressure of gases flowing therethrough, at least one finned-tube heat exchange means disposed within said contacting column, said last-named means being connected in fluid receiving relation to said pressure decreasing means, and means for diverting the downward flow of solids out of contact with said heat exchange means whereby said heat exchange means contacts only the fluids flowing through said contacting column and is out of contact with said solids.

11. An apparatus according to claim 10 wherein said heat exchange means comprises a chamber surrounding said finned tubes and which is open at its top and bottom for fluid flow therethrough, a cap superimposed above said chamber and adapted to divert the downwardly flowing bed of solids around the top of said chamber, and means for diverting the solids flow away from direct contact with the inlet and outlet conduits of said heat exchange means which pass through the space between the outside of said chamber and the inside of said contacting column.

12. In an apparatus for the treatment of a fluid stream through contact with a moving bed of solid granular contact material which comprises a contacting apparatus structure adapted to confine said downwardly moving bed and provided at successively lower levels with a solids-receiving and fluid-disengaging chamber, a fluid-solids contacting chamber, a solids pressuring chamber, and an induction chamber, an elongated conveyance-regeneration conduit communicating at its inlet opening with a low point in said induction chamber and at its outlet opening with said solids-receiving and fluid disengaging chamber, and a means at said outlet opening adapted to apply a force against the mass of contact material discharging therefrom to maintain the solids moving in said conveyance-regeneration conduit substantially at their static bulk density, the improvement which comprises a plurality of bundles of externally finned heat transfer tubes disposed at spaced intervals along the length of and within said contacting chamber, an enclosure surrounding each of said bundles and open at its top and bottom for fluid flow, a cap superimposed upon each of said enclosures adapted to divert solids flow down and around said enclosure while permitting fluid flow from the top thereof whereby said fluid flows through said enclosure in direct contact with said finned tubes and said solids flow around said enclosure out of direct contact therewith, a regeneration fluid recycle conduit opening from said solids-receiving and fluid-disengaging chamber, a plurality of valves disposed in said conduit, the inlet of each of said bundles of finned tubes being connected to the upstream end of one of said valves, the outlet of each of said bundles being connected to the downstream end of the corresponding valve, a fluid compressing means connected in fluid-receiving relation in said regeneration fluid recycle conduit, conduit means for introducing a first part of the compressed fluid from said compressing means into said pressuring chamber, conduit means for introducing a second part of said fluid from said compressing means into said elongated conveyance-regeneration conduit to accomplish the cyclic path, and means for mixing fresh regeneration fluid with said second part of said compressed fluid.

13. An apparatus according to claim 12 in combination with a temperature sensitive element disposed within said contact column downstream from said bundle of finned tubes, and an instrument means responsive to said element and connected to actuate said valve so as to vary the quantity of regeneration off-gas flowing through said bundle of finned tubes.

References Cited in the file of this patent

UNITED STATES PATENTS

| | | |
|---|---|---|
| 2,348,699 | Tuttle | May 9, 1944 |
| 2,350,730 | Degnen | June 6, 1944 |
| 2,440,475 | Jacomini | Apr. 27, 1948 |
| 2,684,873 | Berg | July 27, 1954 |